April 17, 1934.  W. H. CARRIER  1,955,406
APPARATUS FOR CONTROLLING HUMIDITY
Filed Dec. 15, 1932
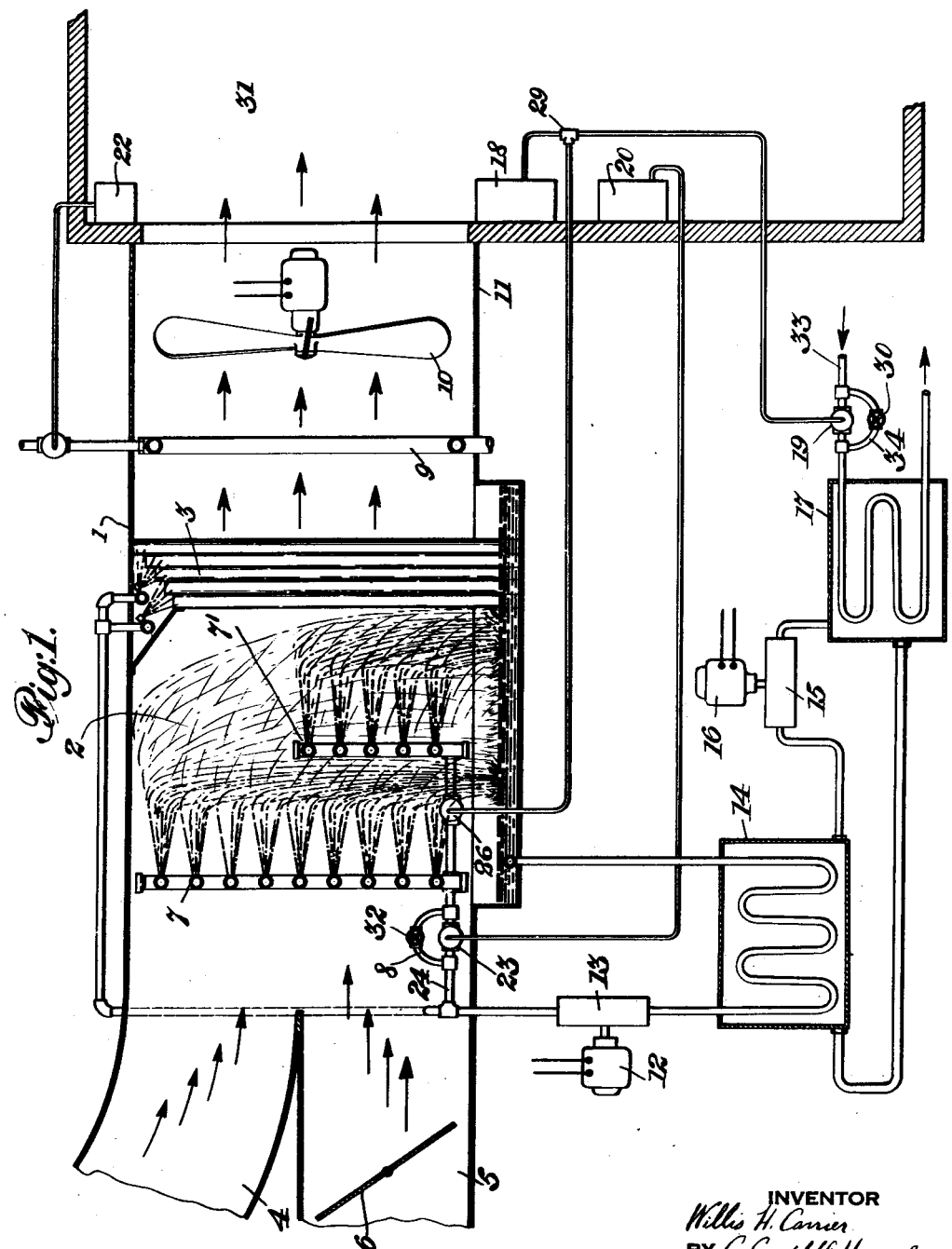

UNITED STATES PATENT OFFICE 1,955,406

APPARATUS FOR CONTROLLING HUMIDITY

Willis H. Carrier, Essex Fells, N. J., assignor to Auditorium Conditioning Corporation, a corporation of New Jersey Application December 15, 1932, Serial No. 647,309

3 Claims. (Cl. 261—115)

This invention is for a method and apparatus for controlling humidity.

I have found that humidity can be controlled in connection with an air washer by simultaneously varying the surface and/or distribution of the spray and, at the same time, modifying its temperature so that the latent heat content may be modified without changing the final heat content of the air or that the sensible heat content of the air may be modified without changing the final moisture content or latent heat content of the air.

One of the objects of this invention is to provide a method and apparatus for humidity control of a partial mixture of outside and return air in any desired fixed proportion within limitations without the use of mechanism for operating the dampers, either by avoiding the use of dampers entirely or by having set dampers which do not require changing to meet various conditions within the space to be conditioned. Another object of my invention for controlling the humidity of air in connection with an air conditioner is to obtain such control by varying the temperature and humidity independently by a simultaneous change in both the water temperature of the air conditioner and surface of distribution of the water. Other objects will appear more fully hereinafter.

Referring to the drawing:

The figure is a diagrammatic view of a device embodying the principles of my invention.

In carrying out my invention I propose to use an air conditioner in which there are one or more banks of vertical sprays 2 preferably discharging horizontally parallel to the air flow and in which there may be a separately flooded eliminator 3. The general construction may be such as Carrier Patent No. 1,059,976, granted April 29th, 1913. I have made certain modifications therein. It will be noted that the return air and outside air are conducted to conditioner 1. The return air being preferably brought in at the top through duct 4 while the fresh air is preferably brought in at the bottom and directed in parallel flow to the return air through duct 5 toward conditioner 1. A damper 6 may be placed in duct 5, if desired, to vary the relative proportions of return and fresh air. I have found that by so directing the return and fresh air to the conditioner 1 there will be a wide degree of stratification in conditioner 1, that is, the lower part of the combined air stream will be to a large per cent outside air while the upper part of the air stream will be largely return air. I therefore propose to have extra nozzles 7' placed in the lower portion of the air conditioner 1 where they concentrate additional spray on that stratum of air having a high percentage of fresh or outside air. In addition, by using the vertical bank of sprays the treatment of the lower stratum of air containing the major portion of the outside air is more thorough than the treatment of the upper zone of air due to the effect of gravity which increases the density of the spray in the lower portion. This effect is intensified whenever the spray is reduced, and it is especially intensified if this spray pressure is reduced by increasing the number of nozzles in operation where these extra nozzles 7' are positioned in the lower portion of the air conditioner as shown. The conditioned air then passes through the flooded eliminators 3 past the reheater 9 and is directed to the enclosure 31 by fan 10 through conduit 11. The spray water temperature is controlled through the Carrier refrigerating machine which comprises pump 13, water cooler 14, compressor 15, motor 16 and condenser 17.

The means of independent control of the cooling and dehumidifying effect within the room, that is, the independent variation of the relation of sensible to latent heat in the combined air stream may be either by hand or through the usual automatic instruments operated conjointly to vary the effective spray surface and simultaneously the effective temperature difference between the air and the water. Also by varying independently or simultaneously the total volume of spray delivered through the nozzles. I propose to vary the area of contact with the water surface by any suitable means such as reduction of spray pressure by throttling but preferably, as I have shown, I decrease the effective area of contact by increasing the number of nozzles 7, 7', through which the cooling water is allowed to discharge. Such extra nozzles 7' are placed as previously described in the bottom of the air conditioner 1.

The opening up of the auxiliary nozzles 7' decreases the pressure hence the particles of water issuing therefrom are larger in size and therefore the total surface area of the same weight of water is decreased. In addition, when the auxiliary sprays 7' are cut down a greater proportion of the water passes through the two stratas.

The reduction in effective surface area of the water spray, even though the total weight of water is not reduced, will tend to cause a greater spread between the dew point of the treated air and the temperature of the spray water. Therefore, by simultaneously decreasing the temperature of the said spray water, either through direct mechanical connections or independently, I am able to vary the ratio of latent to sensible heat in such a way as to reduce the latent heat content without lowering the final sensible heat content of the air thus treated. Conversely, by increasing the effective surface contact of the spray with the air by any of the well known methods, such as reducing the number of sprays 7, 7', in action thereby increasing the uniformity of spray distribution and number of spray particles, and simultaneously raising the temperature of the spray water, I am able to increase the latent heat content of the air thus treated without raising the sensible heat content of the air. The psychrometric and mathematical relationships involved in such control which make its operation practicable can be definitely demonstrated by referring to a conventional psychrometric chart. Assume a homogeneous air mixture of fresh and return air having a temperature of 82° and a moisture content of 80 grains per pound, and assume that the condition of operation was such as to actually produce a resultant mixture after treatment of 62° with 64 grains of moisture per pound of air or a 55° dew point. According to the law of proportionate mixtures, it will be found by drawing a line through these two points of temperature and humidity that it will intersect the saturation curve at 50°. In other words, the mean effective water temperature must be controlled at 50° and the effective surface spray contact provided to give $$\frac{82°-62°}{82°-50°}=\frac{20}{32}=62\%$$

effective surface contact with the air. This effective temperature of the water and this percentage of effective contact with the cold water surface is definitely determined by the requirements. Now, if we wish to lower the moisture content of this air from 64 grains to 59 grains, then by drawing a line on the chart through these two points we find it intersects the saturation line at 39°. Therefore, we must reduce the water temperature from 50° to 39° and reduce the surface contact from 62% to $$\frac{82-62}{82-39}=\frac{20}{43}=46\tfrac{1}{2}\%.$$

Similarly, the change required to raise the final humidity without raising the final moisture or latent heat content and without raising the temperature can be accomplished by increasing the temperature of the water and at the same time increasing the percentage of effective surface contact. Now, suppose that I wish to maintain the moisture content at 64 grains per pound of air, i. e., at 55° dew point, and raise the temperature from 62° to 65°, I will then lower my water temperature from 50° to 45° and reduce my surface contact from 62% to $$\frac{82-65}{82-45}=\frac{17}{37}=46\%.$$

On the other hand, it will be seen that I may lower the temperature without increasing the moisture content by increasing the average temperature of the spray or surface contact and simultaneously increase the percentage of surface contact by increasing the effective area of the water surface.

However, the above analysis of the action upon a homogeneous mixture of return and outside air where the quantity of outside air is relatively small shows how it is possible to vary the temperature and humidity independently by a simultaneous change in both water temperature and surface of distribution. The introduction of the air into air conditioner 1 with the fresh outside air below the return air from the enclosure and the ensuing wide degree of stratification and the more thorough treatment of the lower strata, I have found, gives a better result and extends the range far beyond the theoretical limitations. With my invention therefore it is possible to get a much greater range of control than otherwise possible and it is not necessary to drop the water temperature as much or to reduce the spray pressure to as great an extent to accomplish the desired result. The dehumidification effect thus obtainable is greater than that theoretically obtained for a given reduction of air temperature. By the use of the arrangement shown it is, therefore, possible to control the humidity of the air in the enclosure independently of the temperature through a relatively wide range.

For controlling the humidity I propose to use a hygrostatic element that simultaneously reduces the water temperature by any well known means as illustrated in the figure, where air pressure from hygrostat 18 actuates a throttle valve 19 on the condenser 17. The operation of the hygrostat 18 is such that when humidity rises this hygrostat operates to open both the valves 26 and 19 simulaneously. Thus the spray pressure is decreased and the spray temperature is lowered simultaneously. If direct acting valves are used as would be preferable the operation of the hygrostat in response to an increase in humidity is to reduce the air pressure in the air line 29 for both valves 26 and 19 which open simultaneously and if the humidity in the room lowers then the hygrostat operates to increase the air pressure in pipe 29 and to partially close the valves 26 and 19. The valve 26 operates between full open and complete closure while the valve 19 operates between full open and minimum closure depending upon the minimum setting by-pass valve 30 in by-pass 34 or by a stop preventing full closure in valve 19. The effect of this operation of the hygrostat is to simultaneously decrease the spray pressure and decrease the spray temperature. If a three way mixing valve on the water is used to control the spray temperature directly by mixture this valve operates with the same result as the valve 19 above described. At the same time, the air from the thermostatic valve 20 will turn onto a greater or less extent, the auxiliary nozzles 7' in the lower portion of the air conditioner 1. These two means of control operated simultaneously by hygrostat 18 and thermostat 20 which respond to room humidities and temperatures definitely affect the dew point of the air leaving the conditoner 1 and by this means a much greater proportionate reduction of latent heat would be affected than the reduction of sensible heat. In addition to this, the room thermostat 20 controls the total volume of spray handled by means of a throttling valve 23 on the water pipe 24 leading to the dehumidifier sprays. If the temperature of the enclosure falls the thermostat 20 operates to partly close throttle valve 23 thus reducing the quantity of water to the sprays 7, 7', and therefore reducing the pressure on the sprays. This valve, however, would not operate to completely shut off the water. A predetermined minimum is allowed to pass either by reason of the by-pass 8 of fixed size or by a stop in the valve, or by an adjustable valve 32 in the by-pass, or in any other well known manner. Should the temperature of the enclosure fall still further a minimum thermostat 22 operates a bank of heaters between the conditioner 1 and the enclosure to give the additional heat required to offset the minimum cooling effect of the air conditioner.

The control of the water cooler temperature and the supply water temperature by controlling the functioning of the compressor 15 is by means of a throttle 19 on the supply 33 to the condenser 17. This acts to increase or decrease the quantity of refrigeration supply as well as the temperature at which it is supplied and has the advantage of avoiding the danger of freezing up which would take place if a three way mixing valve were used because of the cold water getting too cold when the temperature of the supply water mixture was raised.

What I claim is:

1. In a system for conditioning air, means for conducting and substantially stratifying in said conditioner fresh and return air, a conditioner, banks of sprays in said conditioner, auxiliary banks of sprays adapted to spray substantially into the stratum of fresh air, a valve to control the auxiliary sprays, said valve being in the supply line from said main sprays, a second valve in the supply line to said sprays, said second valve adapted to shut off a predetermined amount of spray medium, means for operating said valve independently of said first valve.

2. In an air conditioning system, means for directing fresh and return air to a conditioner, a main bank of sprays in said conditioner, an auxiliary bank of sprays in said conditioner, said auxiliary bank supplied with spray material from said main bank, a valve in the auxiliary supply line from said main bank to said auxiliary bank of sprays, a supply line to said main bank, a valve in said main supply line, means for operating said main supply valve from full opening to a predetermined minimum flow, means for opening and closing the valve in said auxiliary line, means for controlling the temperature of the sprays, means operating at a distance to conjointly and simultaneously vary the spray temperature controlling means and to operate the auxiliary spray nozzles, means to control the main spray supply valve and means for delivering the conditioned air.

3. In a system for conditioning air, means for conducting and directing a stream of fresh air and a stream of return air to a conditioner to substantially stratify the air in said conditioner, sprays adapted to spray the strata of return air and the strata of fresh air, auxiliary sprays adapted to spray only the strata of fresh air, a valve to control the sprays in the return air strata and a valve to control the auxiliary sprays in the fresh air strata, means for conjointly controlling said valves, and means for varying the temperature of the spray water.

WILLIS H. CARRIER.